(No Model.)

L. W. HERRICK.
BELT FASTENER.

No. 315,781. Patented Apr. 14, 1885.

WITNESSES:
Donn Twitchell
C. Sedgwick

INVENTOR:
L. W. Herrick
BY Munn & Co
ATTORNEYS.

UNITED STATES PATENT OFFICE.

LEWIS W. HERRICK, OF EDMORE, MICHIGAN, ASSIGNOR TO HIMSELF, LOUIS A. ROLLER, AND JOSIAH H. GIBBS, ALL OF SAME PLACE.

BELT-FASTENER.

SPECIFICATION forming part of Letters Patent No. 315,781, dated April 14, 1885.

Application filed June 28, 1884. (No model.)

*To all whom it may concern:*

Be it known that I, LEWIS W. HERRICK, of Edmore, in the county of Montcalm and State of Michigan, have invented a new and Improved Belt-Fastening, of which the following is a full, clear, and exact description.

My invention consists in certain improvements in that class of belt-fasteners that are formed of a piece of sheet metal having inward-projecting teeth or projections on its ends, so that when said fastenings are bent around the ends of a belt by means of dies the longitudinal edges of said fasteners will be brought together and the teeth or projections will be forced into the belt, as will be hereinafter described and claimed. To remove the ends of the belt from said prior fasteners, it was necessary to use some sort of a tool to pry open the longitudinal edges of the fasteners a sufficient distance to allow of the withdrawal of the belt from the teeth; and the object of my invention is to construct a belt-fastener that may be placed on the end of the belt and removed therefrom without the use of any tools whatever.

Figure 1:
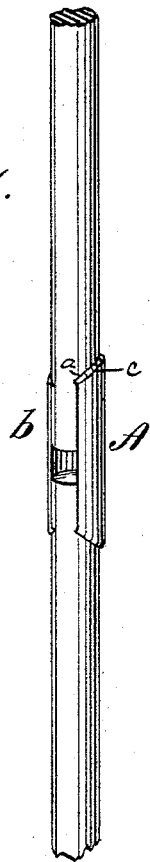
Figure 2:
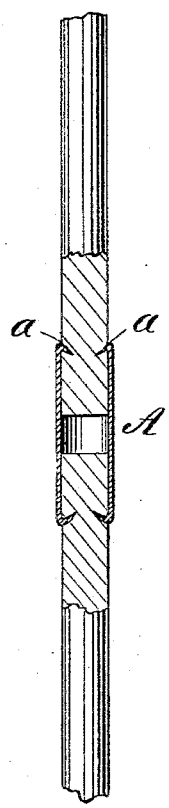
Figure 3:
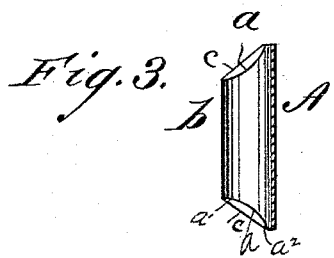
Figure 4:
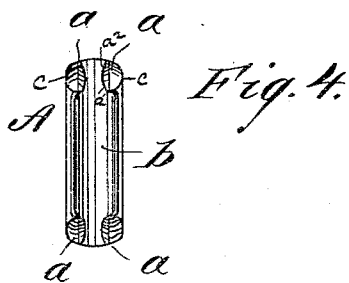

Reference being had to the accompanying drawings, forming part of this specification, in which similar letters indicate corresponding parts in all the figures, Figure 1 is a side view representing the ends of a belt provided with my improved fastening device. Fig. 2 is a sectional side view of the same. Fig. 3 is a longitudinal view of the clip or fastening device, and Fig. 4 is a front view of the same.

The fastening-clip A is made of sheet metal in tubular form, with one side left open at $b$ to allow of the insertion of the belt. The ends of the clip are beveled or inclined from the closed side toward the open side, as shown at $c$. The edges of these inclined ends are bent inward and toward the longitudinal center of the clip to form penetrating projections $a$. The edges of these projections $a$ are rounded, as shown at $a'\, a^2$.

The purpose of rounding the edges of the projections is to allow the ends of the belt, while being inserted or withdrawn, to slightly spring the projections apart to allow of the easy entrance or withdrawal of the belt ends without the use of tools of any kind. When the end of a belt is being inserted, it will first bear against the outer rounded part, $a'$, of the projections $a$, then ride up the incline (see Figs. 1, 3, 4) until it strikes against the closed side of the clip. The projections will take a firm hold, as the tendency is to spring inward. It will be observed when both ends are so secured that any strain put on the belt will only tend to force the ends of the belt farther up the inclined projections; or, in other words, it will tend to keep the belt ends firmly against the closed side of the belt-fastener. There will be no tendency for the belt ends to come out of the open side of the clip, and the strain will not tend to force the upper and lower ends of the clip apart.

Having thus described my invention, what I claim as new, and desire to secure by Letters Patent, is—

1. As an improved article of manufacture, a belt-fastener consisting, essentially, of the clip A, formed with an open side, $b$, through which the ends of a belt may be inserted, and with its ends inclined from the closed to the open side and toward each other, as shown at $c$, the said inclined ends being formed with inward-extending projections $a$ along their inclined edges, substantially as set forth.

2. The clip A, having longitudinal opening $b$, for inserting the ends of a belt, and formed with its opposite ends inclined from the closed toward the open side and toward each other, the said inclined ends being formed along their edges with inward-extending projections $a$, rounded as shown at $a'\, a^2$.

LEWIS W. HERRICK.

Witnesses:
 DAN YOUNGS,
 FRED L. BICKHART.